United States Patent
Neale

[11] Patent Number: 6,053,555
[45] Date of Patent: Apr. 25, 2000

[54] REMOVABLE SEAT ASSEMBLY

[75] Inventor: Colin G. Neale, Northville, Mich.

[73] Assignee: Magna Seating Systems, Inc., Aurora, Canada

[21] Appl. No.: 09/205,759

[22] Filed: Dec. 4, 1998

Related U.S. Application Data

[60] Provisional application No. 60/067,497, Dec. 4, 1997.

[51] Int. Cl.$^7$ ..................................................... B60N 2/02
[52] U.S. Cl. ................. 296/65.03; 296/68.1; 296/65.05; 296/65.13; 296/65.14
[58] Field of Search ............................... 296/68.1, 65.03, 296/65.05, 65.13, 65.14

[56] References Cited

U.S. PATENT DOCUMENTS

| | | | |
|---|---|---|---|
| 3,885,810 | 5/1975 | Chika | 296/68.1 |
| 4,249,769 | 2/1981 | Barecki | 296/68.1 |
| 4,770,459 | 9/1988 | Nakaiwa et al. | 296/68.1 |
| 4,865,377 | 9/1989 | Musser et al. | 296/68.1 |
| 5,238,285 | 8/1993 | Holdampf et al. | 296/65.03 |
| 5,372,398 | 12/1994 | Aneiros et al. | |
| 5,547,242 | 8/1996 | Dukatz et al. | 296/65.03 |
| 5,711,505 | 1/1998 | Nemoto | 296/65.14 |
| 5,765,894 | 6/1998 | Okazaki et al. | 296/65.14 |
| 5,839,773 | 11/1998 | Ban et al. | 296/65.14 |
| 5,895,090 | 4/1999 | Farquhar et al. | 296/68.1 |
| 5,911,465 | 6/1999 | Yamamoto et al. | 296/65.03 |
| 5,951,086 | 9/1999 | Hoshino et al. | 296/65.03 |
| 5,997,069 | 12/1999 | Coffey et al. | 296/65.03 |

Primary Examiner—Joseph D. Pape
Assistant Examiner—Kiran Patel
Attorney, Agent, or Firm—Howard & Howard

[57] ABSTRACT

An automotive seat assembly is removable from a vehicle. The seat assembly has a seat back assembly having a seat back frame and a lightweight back cushion mounted thereon. The seat back frame has an upper portion and a lower portion. The lower portion has rollers for rollingly supporting the seat back. The seat back frame has a structural member extending thereacross with an anchor pin at each end thereof. The structural member has at least one seat belt connecting member for receiving seat belt forces. A seat cushion assembly has a frame and a lightweight cushion mounted thereon. The seat cushion assembly is pivotally mounted to the seat back assembly for pivotal movement between an occupant seating condition and a folded condition wherein the seat cushion assembly is in a face to face relation with the seat back assembly. A first latch assembly selectively secures the upper portion of the seat back frame to an upper interior region of the vehicle. A second latch assembly selectively secures the seat cushion to the vehicle when the seat cushion assembly is pivoted to the occupant seating condition. A retaining member is mounted on opposite interior side walls of the vehicle. The retaining member is positioned to receive each of the pins as the seat back assembly is pivoted about the rollers, whereby when the anchor pins are fully registered within the retaining member, the first latch assembly and the second latch assembly are aligned for respective interengagement and the structural member operably engages the vehicle for transferring the seat belt forces thereto.

17 Claims, 4 Drawing Sheets

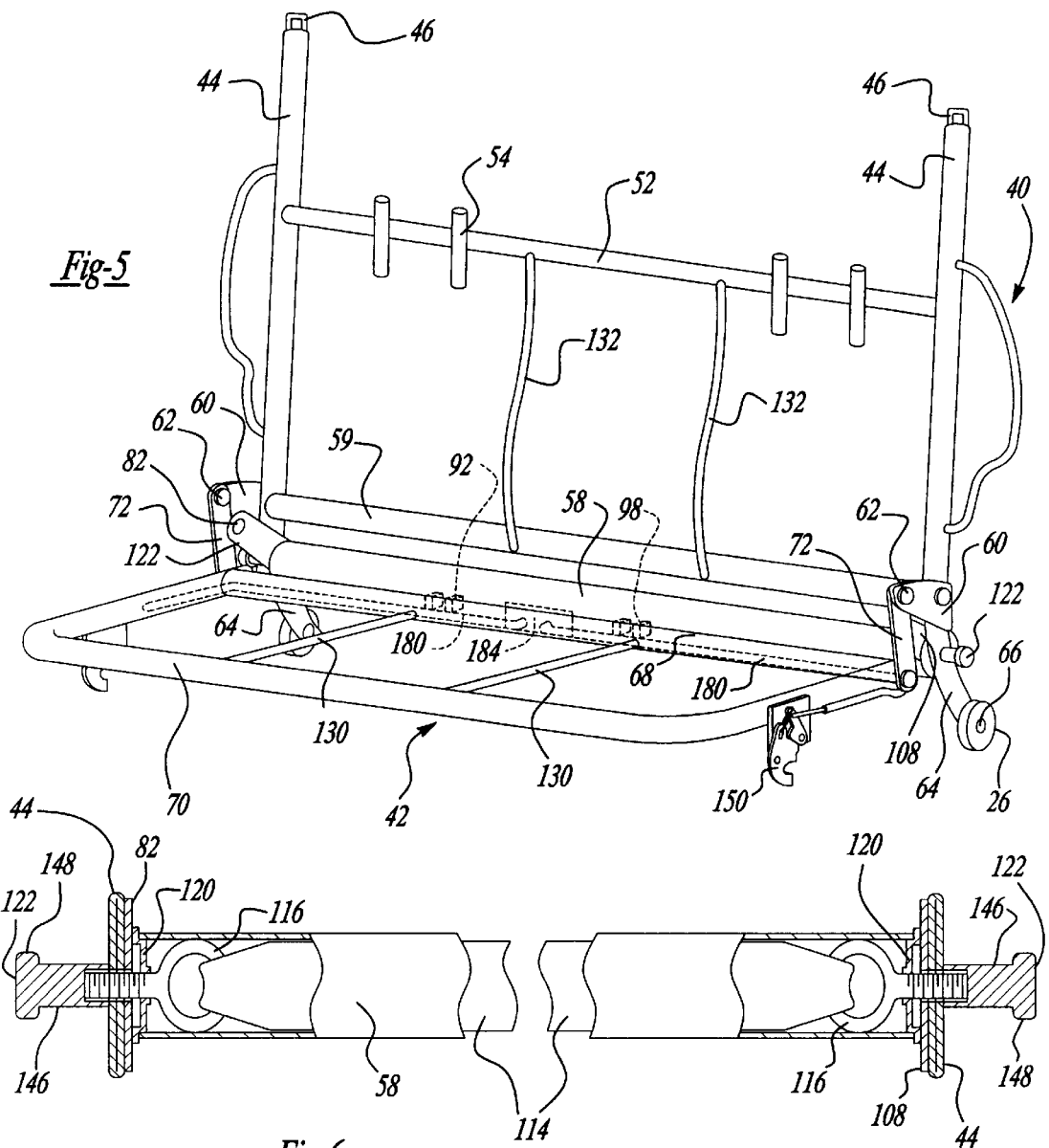
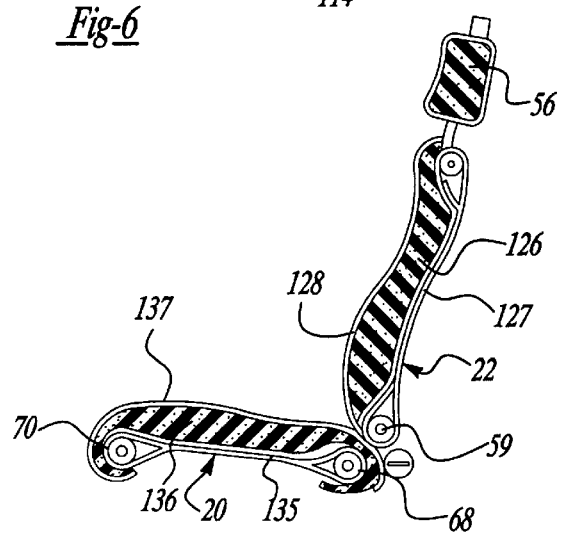

REMOVABLE SEAT ASSEMBLY

RELATED APPLICATION

This patent application claims priority to and all the benefits of U.S. Provisional Patent Application No. 60/067,497, filed on Dec. 4, 1997 and entitled "Removable Suspension Seat".

TECHNICAL FIELD

The subject invention relates to an automotive seat assembly which is easily removable through a rear door of a passenger vehicle or mini-van.

BACKGROUND OF THE INVENTION

Removable seat assemblies for automotive vehicles and the like are well known in the art. As appreciated, cargo space in a rear compartment of the vehicle can be maximized by removing the seat assembly. The removable seat is typically a third row bench type seat which is removed from the vehicle through a rear opening in the vehicle. The prior art removable seats have four locking points which secure the seat to a floor of the vehicle. The locking points are usually latch assemblies mounted to a seat riser on the seat assembly which lock into a pin recessed within the floor. Some of the removable seats include wheels or rollers for assisting in removing the seat from the vehicle. These prior art removable seat assemblies work relatively well when space and/or weight constraints are not a primary concern. The primary deficiencies with these seat assemblies relates to the size and weight of the seats. These removable seats can weigh up to 150 pounds which can create great difficulty in removing the seat from the vehicle. Also, the recessed pins create a cavity within the floor which may cause any number of problems for a user of the vehicle.

SUMMARY OF THE INVENTION AND ADVANTAGES

The disadvantages of the prior art may be overcome by providing an automotive seat assembly which is removable from a vehicle. The seat assembly has a seat back assembly having a seat back frame and a lightweight back cushion mounted thereon. The seat back frame has an upper portion and a lower portion. The lower portion has rollers for rollingly supporting the seat back. The seat back frame has a structural member extending thereacross with an anchor pin at each end thereof. The structural member has at least one seat belt connecting member for receiving seat belt forces. A seat cushion assembly has a frame and a lightweight cushion mounted thereon. The seat cushion assembly is pivotally mounted to the seat back assembly for pivotal movement between an occupant seating condition and a folded condition wherein the seat cushion assembly is in a face to face relation with the seat back assembly. A first latch assembly selectively secures the upper portion of the seat back frame to an upper interior region of the vehicle. A second latch assembly selectively secures the seat cushion to the vehicle when the seat cushion assembly is pivoted to the occupant seating condition. A retaining member is mounted on opposite interior side walls of the vehicle. The retaining member is positioned to receive each of the pins as the seat back assembly is pivoted about the rollers, whereby when the anchor pins are fully registered within the retaining member, the first latch assembly and the second latch assembly are aligned for respective interengagement and the structural member operably engages the vehicle for transferring the seat belt forces thereto.

The seat assembly also includes a support mounted to each of an opposite end of the seat back frame and seat cushion frame for attachment to the vehicle. A structural member extends between the supports for receiving loads from a seat belt. The assembly is characterized by a tension element disposed in parallel with the structural member between the supports for limiting bending of the structural member in response to seat belt loads by acting in tension through the supports and into the vehicle.

Accordingly, the removable seat of the subject invention is lighter and easier to remove that the prior art designs while still maintaining the necessary structural support for the safety of an occupant. The construction of the seat assembly is lightweight to facilitate handling of the assembly while being commensurate with good safety practices.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a perspective view of a seat frame of the removable seat assembly according to the present invention;

FIG. 6 is a fragmentary sectional view of a tension element of the seat frame assembly shown in FIG. 5;

FIG. 9 is a side sectional view of the seat assembly of FIG. 1.

DETAILED DESCRIPTION OF THE PREFERRED EMBODIMENT

Figure 1:
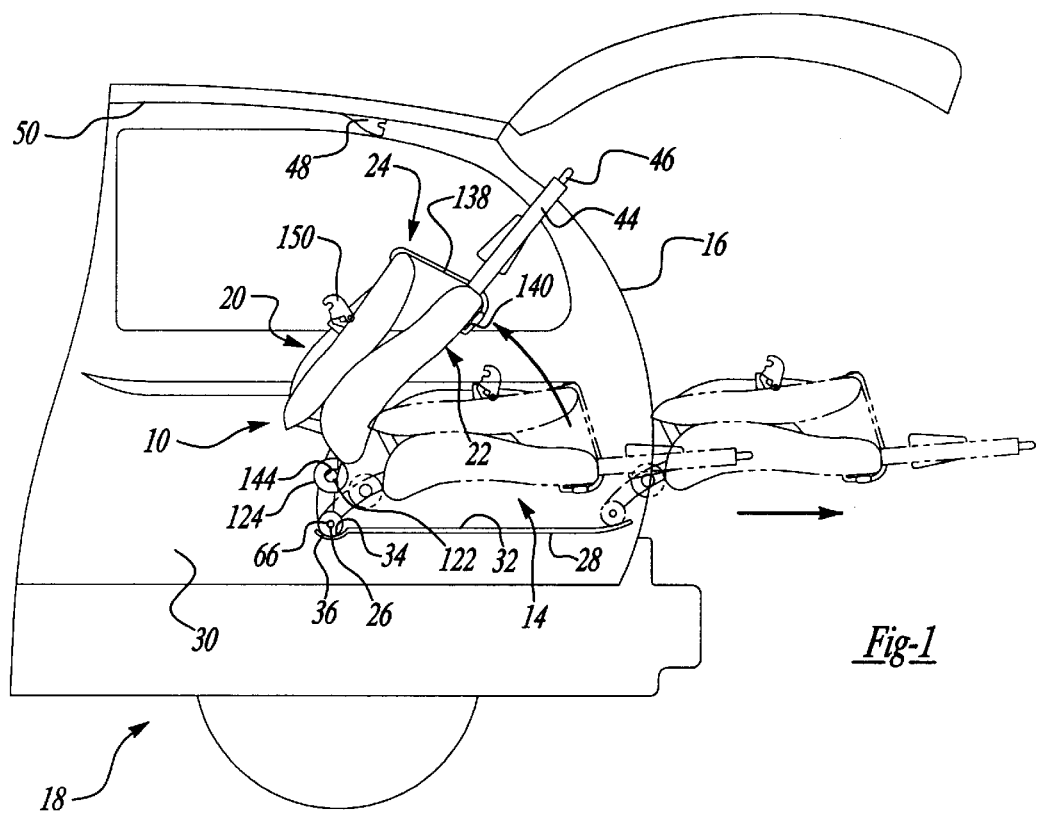
FIG. 1 is a profile view illustrating a removable automotive seat assembly embodying the principles of the present invention in a passenger vehicle and illustrating with phantom lines the capability of the seat assembly to be removed through the rear of the vehicle.

Referring to the Figures, wherein like numerals indicate like or corresponding parts throughout the several views, a profile view of a removable automotive seat assembly is generally indicated at 10 in FIG. 1. The profile view embodies the principles of the present invention and depicts a series of motions in which the seat assembly 10 is pivoted downward to a generally horizontal position, generally indicated at 14, and then removed through a rear opening 16 of a vehicle 18. The vehicle 18 is preferably a passenger vehicle 18. The seat assembly 10 includes two primary subassemblies: a seat cushion assembly, generally indicated at 20, and a seat back assembly, generally indicated at 22.

Figure 2:
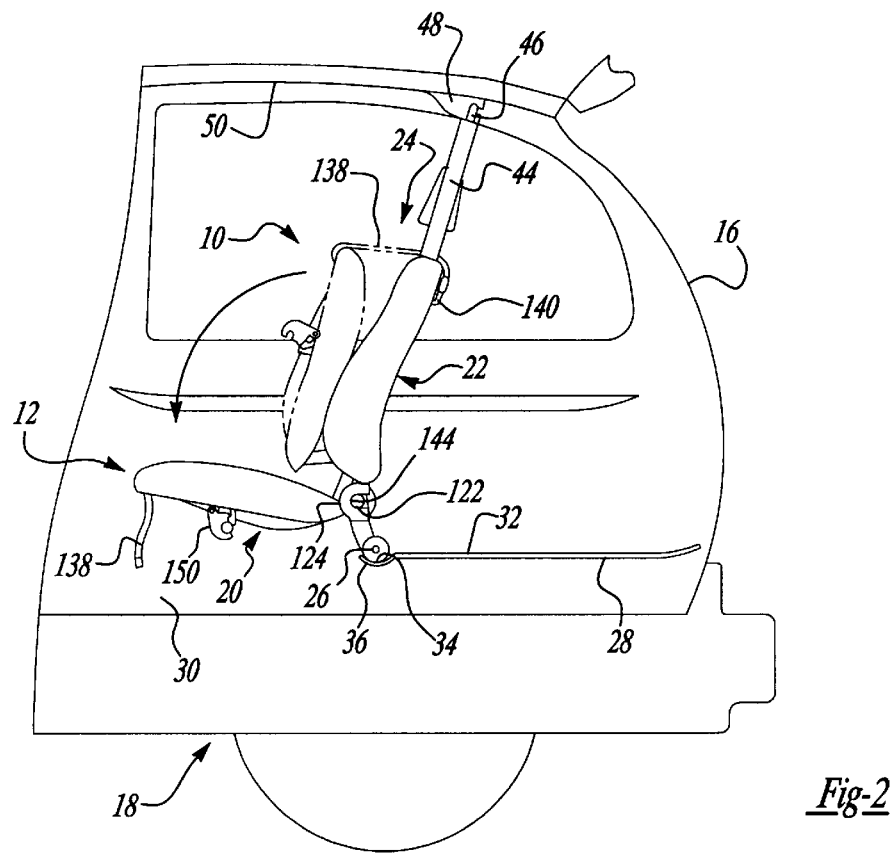
FIG. 2 is a profile view of the seat assembly of FIG. 1 illustrating the capability of a seat cushion assembly of the seat assembly to be pivoted up to a position alongside a seat back assembly.

In accordance with the principles of the present invention, the seat cushion assembly 20 and the seat back assembly 22 are pivotally interrelated to one another so that, as shown in FIG. 2, the seat cushion assembly 20 is capable of being pivoted about a horizontal transverse axis into a folded position, generally indicated at 24, in a face to face condition with the seat back assembly 22. This folded position facilitates removal of the seat assembly 10 from the vehicle 18. Also in accordance with the present invention, a set of rollers 26 are provided on the seat assembly 10 and a set of horizontal guide rails 28 projecting inwardly extends along interior or side walls 30 of the vehicle 18. The rollers 26 and guide rails 28 are configured such that the seat assembly 10 can be aligned in the rear door opening 16 of the vehicle 18 and moved into the interior of the vehicle 18 with the rollers 26 engaged in a rolling relation with upwardly facing rolling surfaces 32 of the guide rails 28. In other words, the guide rails 28 align with the rollers 26 and support the rollers 26 during rearward movement of the seat assembly 10.

Each guide rail 28 extends horizontally along the interior walls 30 of the vehicle 18 from the rear door opening 16 on each wall 30. A pivoting recess 36 is provided on the front end of each guide rail 28 and it is contemplated that the recesses 36 may optionally be formed continuously with a wheelhouse (not shown). The pivoting recesses 36 are upwardly facing concave recesses formed continuously with the guide rails 28 for retaining the rollers 26 in a desired position. The pivoting recesses 36 extend below the guide rails 28 in a generally semi-circular shape having a radius slightly larger than the rollers 26 on the seat assembly 10 and an upwardly facing roller engaging surface 34. As the seat assembly is rolled towards the front of the vehicle 18 along the guide rails 28, the rollers 26 will engage the upwardly facing roller engaging surfaces 34 of the pivoting recesses 36 and be disposed therein. The seat assembly 10 may then be pivoted about the rollers 26 from the horizontal position 14 shown in FIG. 1 to an upright position. The seat cushion assembly 20 may then be pivoted downwards from the folded position 24 against the seat back assembly 22, thereby moving the seat assembly 10 into an operative position 12.

In view of the capability of the seat assembly 10 to be removed from the vehicle 18, it is desirable that the weight of the seat assembly 10 be reduced as much as possible commensurate with good safety and comfort practices. Moreover, since the seat assembly 10 functions as the rear seat in a vehicle-type van, the seat assembly 10 is sized to accommodate three occupants in side-by-side relation. Finally, seat belt assemblies for the three occupants are contemplated to be carried by the seat assembly 10 itself.

Figure 4:
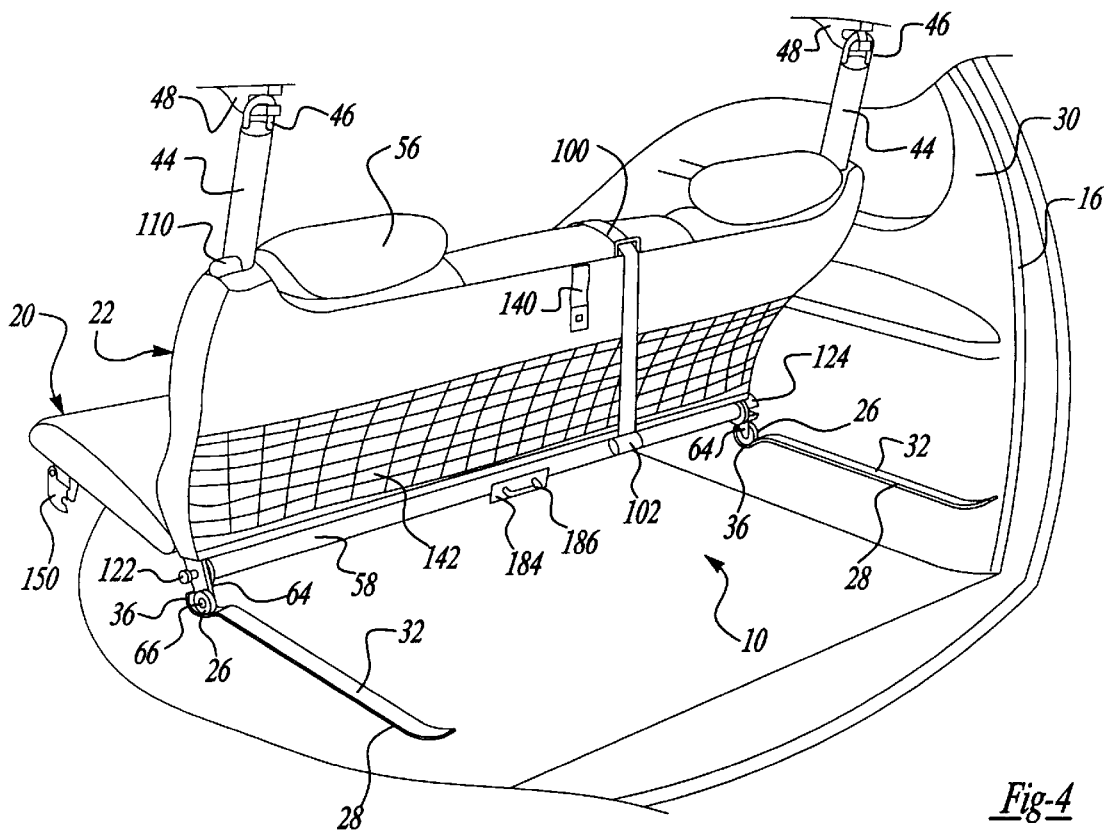
FIG. 4 is a fragmentary perspective view of the interior of the passenger vehicle viewed from the rear of the vehicle with the removable seat assembly inside the vehicle.

All of these factors make weight reduction difficult to achieve. To this end, the seat assembly 10, referring more particularly to FIG. 5, includes a seat back frame, generally indicated at 40, and a seat cushion frame, generally indicated at 42, which is pivotally mounted to the seat back frame 40. The seat back frame 40 and seat cushion frame 42 extend between opposite ends. The seat back frame 40 has an upper portion and a lower portion with a pair of transversely spaced interconnecting side frame members 44 which are of tubular construction. A first latch member 46 is mounted to the upper portion of the seat back frame 40 for fixedly securing the upper portion of the seat back frame 40 to the vehicle 18. Specifically, the first latch member 46 includes hooks or keepers mounted to the upper distal ends of the side frame members 44. A latch 48 is located on a ceiling 50 of the vehicle 18 as shown in FIGS. 1, 2, and 4. When the seat assembly 10 is disposed in the operative position 12, the hooks 46 engage the latches 48 to prevent the seat assembly 10 from pivoting back about the rollers 26.

The latches 48 have a construction similar to conventional door latches. Examples of such door latches are given in U.S. Pat. Nos. 3,523,704, 3,697,105, 5,000,495, and 4,929,007, all of which are hereby incorporated into the present application by references. It is also contemplated that a construction such as that of a hood latch disclosed in U.S. Pat. No. 4,936,611 could be used, which is hereby incorporated into the present application by reference. A handle (not shown) disposed on the ceiling 50 is operatively connected to each latch 48 by a Bowden wire assembly (not shown) or other mechanism suitable for transmitting movement. Manual actuation of the handle releases the latches 48 and allows the hooks 46 to be disengaged from the latch 48, thereby permitting the seat assembly 10 to be pivoted backward about the rollers 26.

Extending between the mid-portions of the two side frame members 44 at the upper portion of the seat back frame 40 is an upper horizontal frame member 52 which carries a series of tubes 54 for adjustably receiving a pair of headrest assemblies 56. Extending between the flattened lower extremities of the side frame members 44 at the lower portion of the seat back frame 40 is a structural member 58. Disposed immediately above the structural member 58 is an intermediate horizontal frame member 59 also extending between the flattened lower extremities of the side frame members 44. The flattened lower extremities of the side frame members 44 are fixed by welding, bolts, or other suitable attachment means to outer bracket plates 60 which extend forwardly and are apertured to receive hinge pins 62. The structural member 58 and the intermediate horizontal frame member 59 are of tubular construction and formed of a suitable lightweight structural metal.

Extending from the lower ends of the side frame members 44 below the lower portion of the seat back frame 40 are brackets 64. The brackets 64 extend downward in a tapered manner and each have an aperture configured to rotatably receive an axle pin 66. The rollers 26 are rotatably mounted to the brackets 64 for providing a rotatable support for the seat assembly 10 during the rearward movement of the seat assembly 10 through the rear opening 16 in the vehicle 18. Specifically, the rollers 26 are mounted to the brackets 64 by inserting the axle pins 66 into the apertures and fixing the pins 66 therein with suitable attachment means such as a rotatable socket (not shown) or other attachment hardware which will allow the rollers 26 to rotate freely. Also, it is contemplated that one axle (not shown) may extend horizontally through both apertures in the brackets 64 and the rollers 26 may be fixed to the ends of that axle. Furthermore, the rollers themselves may include a hub with means (not shown) to allow the rollers 26 to roll around an axle pin fixedly attached to the bracket 64 such as ball bearings disposed within the hub.

The seat cushion frame 42 includes a rear frame member 68 and a U-shaped tubular frame member 70 extending from opposite ends thereof so as to define an essentially rectangular frame. Fixed to each end of the rear frame member 68 is an inner bracket plate 72 which is apertured to receive an associated hinge pin 62. In this way, the hinge pins 62 cooperate with the inner and outer bracket plates 60, 72 to effect the pivotal mounting of the seat cushion assembly 20 to the seat back assembly 22.

The seat back assembly 22 includes in conjunction with the seat back frame 40 a foam back cushion 126 covered with a suitable cover material 128. To enable the foam cushion 126 and cover material 128 to be minimized in bulk and weight, a seat back suspension membrane 127 made of a canvas-like material may be fixed between the side frame members 44 and the upper and intermediate horizontal frame members 52, 59. A pair of spring-like elongated stabilizing elements 132 are mounted between the upper and intermediate horizontal frame members 52, 59 to aid in the support of the foam cushion 126. Similarly, a suspension membrane 135 is mounted between the rear frame member 68 and the U-shaped frame member 70 to receive thereon a foam seat cushion 136 suitably covered by a cover material 137. As before, a pair of stabilizing elements 130 may be provided between members 68 and 70 to aid in supporting the foam seat cushion 136, if desired.

Also, at least one retaining strap 138, 140 is mounted to the seat assembly 10. Specifically, retaining strap 138 is provided on the bottom of the seat cushion assembly 20. The retaining strap 138 is long enough so that a person standing behind the seat assembly 10 can reach over the seat back assembly 22, grasp the retaining strap 138, and manually pull the seat cushion assembly 20 to the folded position 24 along side the seat back assembly 22. A short retaining strap 140 is provided on the back of the seat back assembly 22. The retaining straps 138, 140 are provided with means, such as snaps or buckles, for engaging each other in an interlocking manner to retain the seat cushion assembly 20 in the folded position 24 as shown in FIG. 2.

Additionally, a cargo net 142 as best seen in FIG. 4 is provided on the back of the seat back assembly 22. The cargo net 142 may be made up of an interwoven mesh or a solid fabric material. The net is suitably attached by sewing, glue, or other suitable attachment means to define one or more pockets on the back of the seat back assembly 22. Small items can be stored in the cargo net 142 to prevent them from moving about the rear compartment of the vehicle 18.

Figure 3:
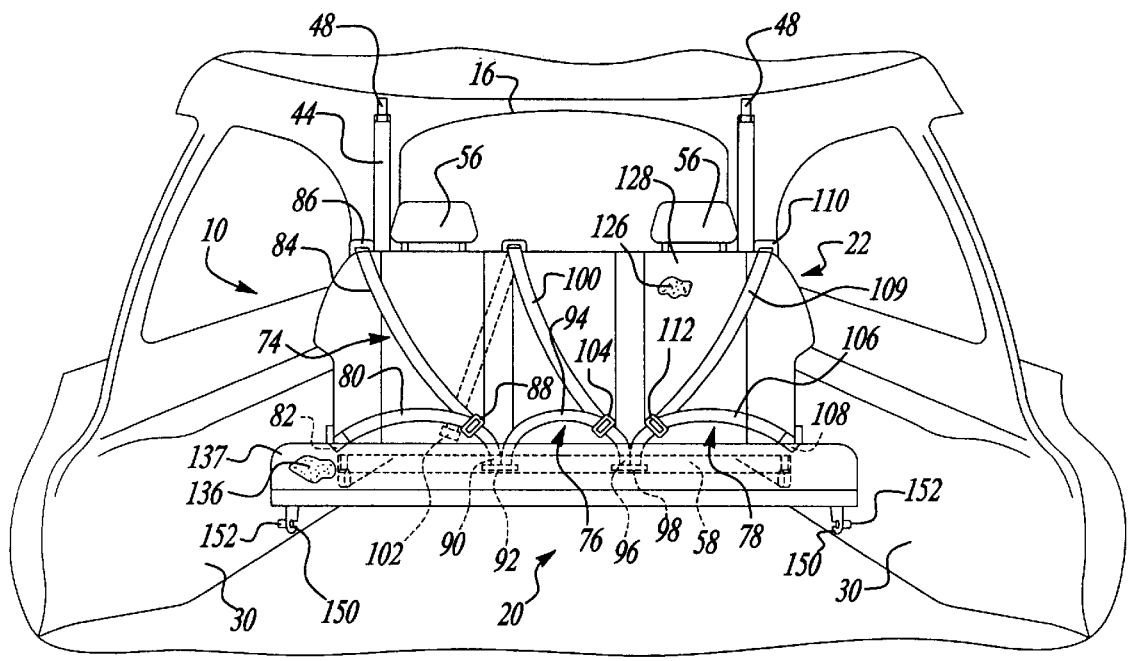
FIG. 3 is a fragmentary perspective view of the interior of the vehicle viewed from the front of the vehicle with the removable seat assembly according to the present invention in an operative position inside the vehicle.

As best shown in FIG. 3, the seat assembly 10 includes for the three occupants three separate seat belt assemblies, generally indicated at 74, 76, 78. A right seat belt assembly 74 includes a lap belt 80 which is suitably fixed at one end to a connecting member 82 which, in turn, is fixed to the right end of the structural member 58 as shown in FIG. 6. The opposite end of the lap belt 80 is connected with one end of a shoulder belt 84 which extends from a reel assembly 86 carried by the seat back frame 40 at a position adjacent the juncture of the right side frame member 44 and the upper horizontal frame member 52. The interconnected lap and shoulder belts 80, 84 are provided with a latch element (not shown) which enters a releasable latch receiving assembly 88 having a short belt which is fixed to a connecting member 90 which, in turn, is fixed to a bracket 92. Bracket 92 is fixed, as by welding, bolts, or other suitable attachment means, to the exterior surface of the structural member 58 at a position spaced from the right end thereof as shown in FIG. 5.

Similarly, a middle seat belt assembly 76 includes a lap belt 94 which is fixed at one end to the connecting member 90. The lap belt 94 has its opposite end connected with a shoulder belt 100 which extends over the central portion of the seat back assembly 22 and downwardly to a reel assembly 102 fixedly carried by the structural member 58. As before, the end of the lap belt 94 at its connection with the shoulder belt 100 is provided with a latch element (not shown) operable to enter a releasable latch receiving assembly 104 fixed on a short belt suitably fixed to a connecting member 96 which in turn is connected to a bracket 98 fixed, as by welding, bolts, or other suitable attachment means, to the exterior surface of the structural member 58 in spaced relation to the bracket 92 as shown in FIG. 5.

Finally, the left seat belt assembly 78 includes a lap belt 106 which is fixed at one end to a connecting member 108 which, in turn, is suitably fixed to the left end of the structural member 58 as shown in FIG. 6. The lap belt 106 has its opposite end affixed to the adjacent end of a shoulder belt 109 which extends from a reel assembly 110 fixed to the upper end of the seat back frame 40 at the juncture between the upper horizontal frame member 52 and the left side frame member 44. As before, the interconnected ends of the lap belt 106 and shoulder belt 109 are provided with a latch element (not shown) which enters a releasable latch receiving assembly 112 carried by a short belt which is fixed to the connecting member 96. Optionally, the shoulder belt 100 of the middle belt assembly can be eliminated. From the above, it can be seen that the seat belt assemblies 74, 76, 78 are of conventional reel-type construction and that any other conventional type may be utilized so long as the connection with the seat assembly 10 is the same.

In the event of an accident such as a head-on collision, the forward thrust of the seat occupants is resisted by the seat belt assemblies 74, 76, 78. The stress thus imposed on the seat belt assemblies 74, 76, 78 is, in turn, transmitted to the structural member 58 by the connecting members 82, 90, 96, 108. The forces transmitted to the middle connecting members 90, 96 will cause the structural member 58 to bend in a forward direction.

Instead providing the structural member 58 with a thicker wall and the added weight thereof to resist this bending action, a tension element 114 is mounted within the hollow tube of the structural member 58. The tension element 114 is disposed in parallel with the structural member 58. As best shown in FIG. 6, the tension element 114 is in the form of a belt 114 having a construction like a seat belt. Specifically, the belt 114 is disposed within the hollow tube. It will be understood that other tensile elements may be utilized such as ropes, chains, cables and the like. The seat belt tension element 114 is preferred because of its strength to weight ratio.

As shown in FIG. 6, end caps 120 are mounted to each end of the hollow tube. The tension element 114 has its opposite ends connected with eye bolts 116 extending through openings in the recessed end caps 120. Each eye bolt 116 is threaded to receive an anchor pin at a first end and is secured to the belt 114 at a second end. The anchor pin 122 is mounted to each opposite end of the seat back frame 40. The structural member 58 extends between the anchor pins 122 for receiving loads from the seat belt assemblies 74, 76, 78. As appreciated, the tension element 114 is mounted between the anchor pins 122 for limiting bending of the structural member 58 in response to seat belt loads by acting in tension through the anchor pins 122 a nd into the vehicle 18.

The anchor pins 122 secure the side frame members 44 and the outside connecting members 82,108 to the structural member 58 by passing the eye bolts 116 through apertures in each. The two anchor pins 122 are turned in operative relation with the eye bolts 116 with a tightness just sufficient to maintain the tension element 114 taut under normal circumstances without any significant pressure being applied thereto. Under a stress condition, however, where bending forces are applied to the structural member 58, the bending stresses are resisted by the tensile forces which build up into the tension element 114 as the structural member 58 is bent. The tensile forces that build up in the tension element 114 are transmitted to the eye bolts 116 and the anchor pins 122.

Referring also to FIGS. 1, 2, and 4, the seat assembly 10 is selectively retained in its operating position during these stress conditions by means of a pair of retaining members 124 fixed to the side walls 30 of the vehicle 18. Specifically, the anchor pins 122 transmit the tensile forces from the tension element 114 to the retaining members 124 and the walls 30 of the vehicle 18. Thus, the tension element 114 resists the bending stresses by transmitting the tensile forces to the interior walls 30 of the vehicle 18. This resistance to the bending action provides the necessary strength to resist the peak load conditions with a construction which is considerably less in terms of overall weight than would be required in a simple structural member.

As is evident from FIG. 6, the anchor pins 122 are in a knob-like configuration. The retaining members 124 define an essentially C-shaped slot 144 facing generally toward the rear of the vehicle 18 so as to receive both a knob end 146 as well as a shank 148 of the anchor pins 122 as the seat assembly 10 is pivoted up to the operative position 12 on the rollers 26. The retaining members 124 serve essentially a supporting function whereas the retention function is performed by a pair of second latches, generally indicated at 150.

The seat assembly 10 has a catch for supporting the lower portion of the seat back frame 40 on the vehicle 18 and for limiting forward movement of the seat assembly 10 relative to the vehicle 18 and for allowing rearward movement of the seat assembly 10 through the rear opening 16 in the vehicle 18 upon release of the first 46 and second 150 latches. The catch includes the anchor pins 122 and the retaining members 124. The C-shaped slot of retaining members 124 receives the shank 148 of the anchor pin 122 when the seat assembly 10 is moved in the forward direction and allows the anchor pin 122 to move out of the slot of retaining member 124 when the seat assembly 10 is moved in a rearward direction.

The second latches 150 are fixed to opposite sides of the U-shaped frame member 70 of the seat cushion frame 42 in depending relation thereto. The second latches 150 are adapted to receive and retain a pair of knob-like supporting pins 152 extending from the side walls 30 of the vehicle 18 in forwardly spaced relation to the retaining members 124.

Figure 7:
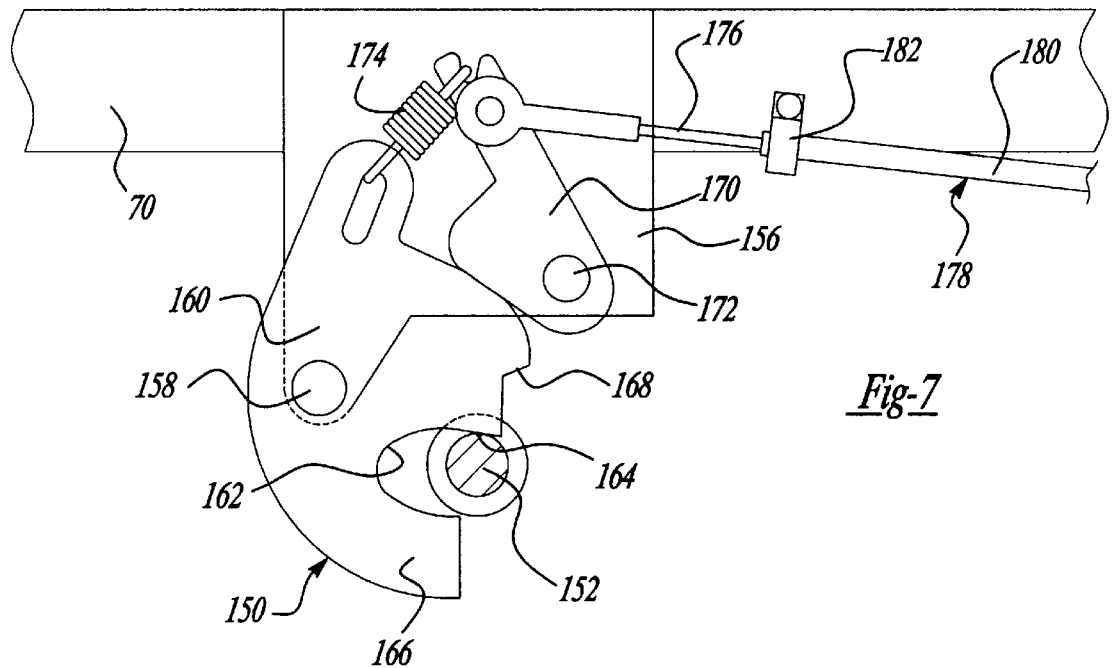
FIG. 7 is a side view of a latch of the seat frame shown in FIG. 5 in the open position.
Figure 8:
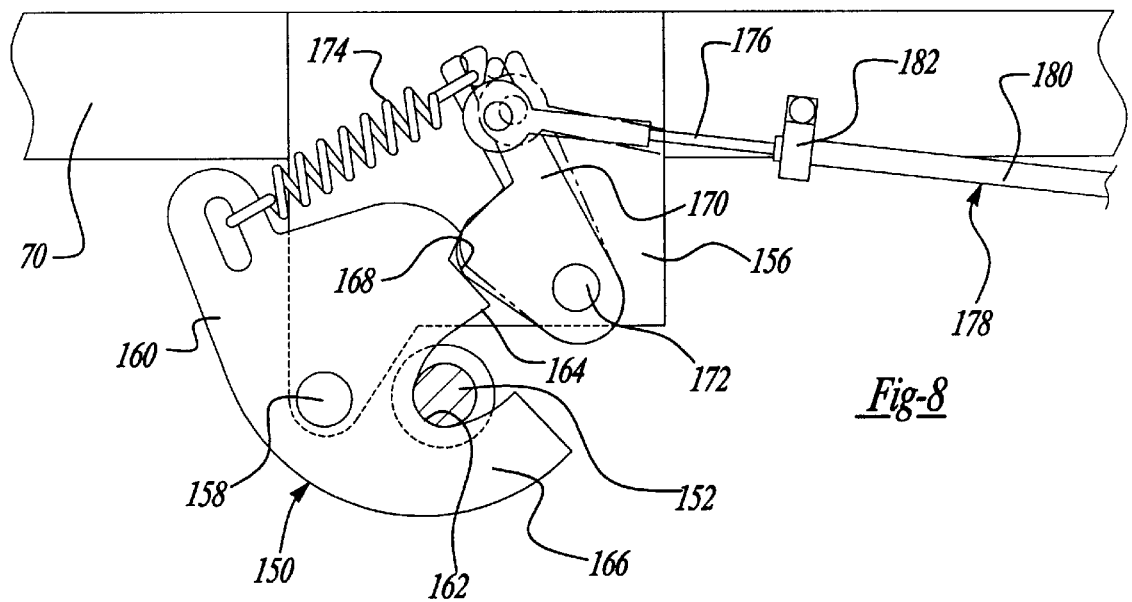
FIG. 8 is a side view of the latch shown in FIG. 7 in the closed position.

As best shown in FIGS. 7 and 8, each second latch 150 includes a mounting plate 156 suitably fixed to the exterior surface of the associated leg of the U-shaped frame member 70 in depending relation. Affixed to each mounting plate 156 at a lower end portion thereof is a pivot pin 158 on which is mounted a latch member 160. Each latch member 160 includes a rearwardly opening pin receiving slot 162 which provides a downwardly facing pin engaging surface 164 which extends beyond a lower jaw like portion 166 of the latch member 160. The pin receiving slot 162 selectively engages the pin 152 extending from the side wall 30 of the vehicle 18.

Formed in the rearward face of each latch member 160 is a locking surface 168 which is adapted to be engaged by a locking member 170 which is pivotally mounted on the mounting plate 156 by a pivot pin 172 disposed parallel with the pivot pin 158. The locking member 170 is in selective locking engagement with the latch member 160 for locking and unlocking the latch member 160. A suitable biasing structure in the form of a tension coil spring 174 is mounted between an upper end of each locking member 170 and an upper end of each latch member 160. In addition, the upper end of each locking member 170 is connected to one end of a wire cable 176 forming a component of a Bowden wire assembly, generally indicated at 178. Each Bowden wire assembly 178 includes a flexible conduit 180 which slidably receives the wire cable 176 therein. One end of each conduit 180 is suitably fixed to the associated leg of the U-shaped frame member 70, as by a clip 182. Each conduit 180, containing the associated cable 176, extends beneath the associated leg of the U-shaped member 70 and has its opposite end fixed to a mounting plate 184 secured to the rear surface of the structural member 58 in depending relation thereto.

As shown in FIG. 5, both Bowden wire assemblies 178 are thus connected in side-by-side relation to the mounting plate 184. The cables 176 extending from the conduit 180 are connected to a handle 186 best seen in FIG. 4. By pulling the handle 186, both cables 176 are moved within the respective conduits 180 to effect a movement of the locking members 170 about their pivot pins 172.

The seat assembly 10 is moved into its operating position 12 by moving the seat assembly 10 forward with its rollers 26 engaging the guide rails 28 in a rolling relation. When the rollers 26 reach the pivoting recesses 36 on the guide rails 28, the seat assembly 10 is pivoted forwards and upwards about the rollers 26 and the pins 122 will engage the retaining members 124. Once anchor pins 122 are fully registered within the retaining members 124, the seat back assembly 22 will rotate about the anchor pins 122, thus stopping the forward pivotal movement of the seat assembly 10 about rollers 26. The retaining members 124 will position the seat back assembly 22 such that the hooks 46 of the side frame members 44 will then engage the latches 48 on the ceiling 50 of the vehicle 18. Once engaged, the seat back assembly 22 is held in position at upper, intermediate and lower points by the hooks 46, anchor pins 122 and rollers 26. Next, the seat cushion assembly 20 is pivoted downwardly about the hinge pins 62 with respect to the seat back assembly 22. During the latter part of this movement, the second latches 150, carried by the seat cushion assembly 20, will be moved into operative relation with the support pins 152 carried by the walls 30 of the vehicle 18.

FIG. 7 illustrates the position of each second latch 150 just prior to the engagement of the associated support pin 152. As the seat cushion assembly 20 is moved further downwardly, each latch member 160 is pivoted in a counterclockwise direction, as viewed in FIG. 8, causing the spring 174 to extend. Each latch member 160 will continue to be pivoted until the associated supporting pin 152 engages the associated mounting plate 156, at which time the locking members 170 are biased by the springs 174 to engage within locking surfaces 168 formed in the forward portion of the latch members 160. The support pins 152 are thus fixedly retained in the second latches 150. In this way, the seat assembly 10 is retained in its operating position 12.

When it is desired to move the seat assembly 10 from its operative position 12 and remove the seat assembly 10 from the vehicle 18, the handle 186 is actuated or pulled outwardly which, through the operation of the cables 176, will move the locking members 170 into a position to release the latch members 160. The springs 174 are then operable to bias the latch members 160 downwardly which has the effect of lifting the seat cushion assembly 20 slightly as the second latches 150 assume the position shown in FIG. 7. The seat cushion assembly 20 can then be further raised manually into the folded position 24 alongside the seat back assembly 22 as shown in FIG. 2. The retaining straps 138, 140 may be secured together to fixedly hold the seat cushion assembly 20 against the seat back assembly 22. The handle disposed in the ceiling 50 is then actuated which actuates the locks 48 to disengage the hooks 46 from the locks 48. The side frame members 44 are now released from the ceiling 50 and the entire seat assembly 10 can be manually pivoted backwards about the rollers 26 as shown in FIG. 1. As the seat assembly 10 is pivoted backwards, the anchor pins 122 are disengaged from the retaining members 124. The pivoting continues until the entire seat assembly 10 is in the horizontal position 14.

In this horizontal position 14, the seat assembly 10 can then be manually moved toward the rear of the vehicle 18 with the rollers 26 engaging the guide rails 28 in a rolling relation and then be removed from the vehicle 18. The folded position 24 of the seat assembly 10 facilitates easy handling and storage of the seat assembly 10. It can be seen that the removability of the seat assembly 10 allows a vehicle owner to maximize the cargo space available in this vehicle 18, while the sturdy and lightweight construction of the seat is commensurate with good safety practices and makes the handling of the seat assembly 10 easier.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that thin the scope of the appended claims the invention may be practiced otherwise than as specifically described.

What is claimed is:

1. An automotive seat assembly removable from a vehicle, said seat assembly comprising:

a seat back assembly comprising a seat back frame and a lightweight back cushion mounted thereon, said seat back frame having an upper portion and a lower portion, said lower portion having rollers for rollingly supporting said seat back, said seat back frame having a structural member extending thereacross with an anchor pin at each end thereof, said structural member having at least one seat belt connecting member for receiving seat belt forces;

a seat cushion assembly comprising a frame and a lightweight cushion mounted thereon, said seat cushion assembly pivotally mounted to said seat back assembly for pivotal movement between an occupant seating condition and a folded condition wherein said seat cushion assembly is in a face to face relation with said seat back assembly;

a first latch assembly constructed and arranged to selectively secure said upper portion of said seat back frame to an upper interior region of the vehicle;

a second latch assembly constructed and arranged to selectively secure said seat cushion assembly to the vehicle when said seat cushion assembly is pivoted to said occupant seating condition; and a retaining member mounted on opposite interior side walls of the vehicle, said retaining member positioned to receive each of said pins as said seat back assembly is pivoted about said rollers, whereby when said anchor pins are fully registered within said retaining member said first latch assembly and said second latch assembly are aligned for respective interengagement and said structural member operably engages the vehicle for transferring said seat belt forces thereto.

2. An automotive seat assembly as set forth in claim 1 wherein said structural member comprises a hollow tube and a tension element disposed in parallel with said hollow tube and extending between opposite ends of said hollow tube thereby limiting bending of said structural member in response to said seat belt loads by acting in tension.

3. An automotive seat assembly as set forth in claim 2 further including eye bolts disposed at each of said opposite ends of said hollow tube and said eye bolts connecting said anchor pins to said tension element.

4. An automotive seat assembly as set forth in claim 2 further including side frame members interconnecting said upper and lower portions of said seat back frame and said first latch assembly comprising a hook mounted to each of said side frame members for engagement with a latch mounted on the upper interior region of the vehicle.

5. An automotive seat assembly as set forth in claim 4 wherein said second latch assembly comprises a latch member pivotally mounted on each side of said seat cushion frame, said latch members biased to a latching position for engagement with a supporting pin mounted on each of the opposite interior side walls of the vehicle.

6. An automotive seat assembly as set forth in claim 5 further including a cable extending to each of said latch members to operably pivot said latch members against said bias from said latching position to a release position.

7. An automotive seat assembly as set forth in claim 6 further including a handle mounted to said lower portion of said seat back frame and connected to said cable for selectively actuating said cable for unlatching said second latch assembly.

8. An automotive seat assembly as set forth in claim 7 further including at least one retaining strap mounted to said seat assembly for securing said seat cushion assembly against said seat back assembly.

9. An automotive seat assembly as set forth in claim 2 wherein said retaining member attached to each of said side walls defines a C-shaped slot for receiving said anchor pins.

10. An automotive seat assembly as set forth in claim 2 further including a pair of guide rails mounted within the vehicle for aligning with said rollers and supporting said rollers during said rolling movement of said seat assembly.

11. An automotive seat assembly as set forth in claim 10 wherein said guide rails each include a recess for receiving said rollers to position said seat assembly to radially align with said retaining members during pivotal movement about said rollers.

12. An automotive seat assembly as set forth in claim 11 further including side frame members interconnecting said upper and lower portions of said seat back frame and said first latch assembly comprising a hook mounted to each of said side frame members for engagement with a latch mounted on the upper interior region of the vehicle.

13. An automotive seat assembly as set forth in claim 12 wherein said second latch assembly comprises a latch member pivotally mounted on each side of said seat cushion frame, said latch members biased to a latching position for engagement with a supporting pin mounted on each of the opposite interior side walls of the vehicle.

14. An automotive seat assembly as set forth in claim 13 further including a cable extending to each of said latch members to operably pivot said latch members against said bias from said latching position to a release position.

15. An automotive seat assembly as set forth in claim 14 further including a handle mounted to said lower portion of said seat back frame and connected to said cable for selectively actuating said cable for unlatching said second latch assembly.

16. An automotive seat assembly as set forth in claim 15 further including at least one retaining strap mounted to said seat assembly for securing said seat cushion assembly against said seat back assembly.

17. An automotive seat assembly as set forth in claim 16 further including eye bolts disposed at each of said opposite ends of said hollow tube and said eye bolts connecting said anchor pins to said tension element.

* * * * *